United States Patent [19]
Tibbetts

[11] 3,885,586
[45] May 27, 1975

[54] KEY ACTUATED LOCKING VALVE

[76] Inventor: Rodney B. Tibbetts, 9210 Stamp Ave., Downey, Calif. 90240

[22] Filed: Aug. 23, 1973

[21] Appl. No.: 390,683

[52] U.S. Cl. ............................ 137/354; 137/384.2
[51] Int. Cl. ............................................ F16k 35/06
[58] Field of Search ..................... 137/354, 383–385

[56] References Cited
UNITED STATES PATENTS

| | | | |
|---|---|---|---|
| 1,823,006 | 9/1931 | Soupal | 137/384.2 |
| 2,006,027 | 6/1935 | Moore | 137/384.2 |
| 2,881,789 | 4/1959 | Finazzo | 137/354 |
| 3,362,426 | 1/1968 | Polit et al. | 137/384.2 |
| 3,695,287 | 10/1972 | Reese et al. | 137/554 |

*Primary Examiner*—Henry T. Klinksiek
*Attorney, Agent, or Firm*—John T. Matlago

[57] ABSTRACT

A key actuated locking valve for use as an anti-theft device in automobiles is provided. The device includes a tumbler lock provided with a barrel and a cylindrical plug and a valve body having a ball seated therein with a stem on the upper end thereof which protrudes through the upper wall of the valve body. The ball is provided with a passage therethrough for connecting the inlet and outlet ends of the valve body. Means are provided for securing the valve body to the barrel of the tumbler lock such that the end of the plug is held in engagement with the stem on the ball in the valve body. This enables the anti-theft device to be mounted by having the upper end of the barrel extend through an opening provided in the floor pan of the driver's compartment of the automobile and secured in position on the floor pan by an upper and lower nut on the barrel. With the anti-theft device so mounted the valve body on the underside of the floor pan is then inserted in a cut made in the fuel line connecting the fuel tank to the fuel pump of the engine. A key for the tumbler lock is insertable in the plug to rotate the plug and therefore the ball in the valve body to its open and closed position.

4 Claims, 12 Drawing Figures

3,885,586

SHEET 1

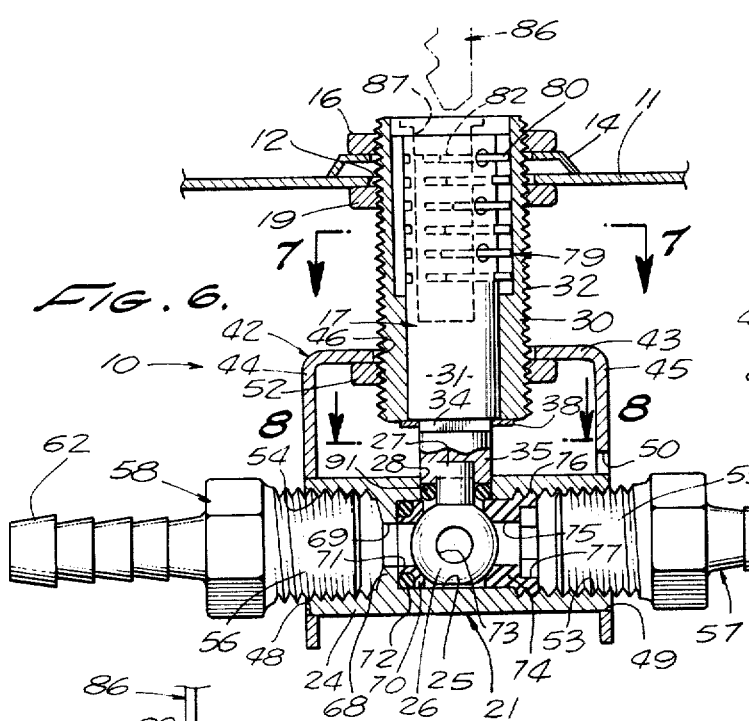
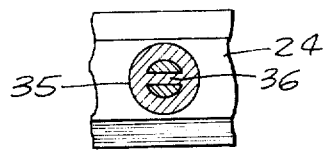
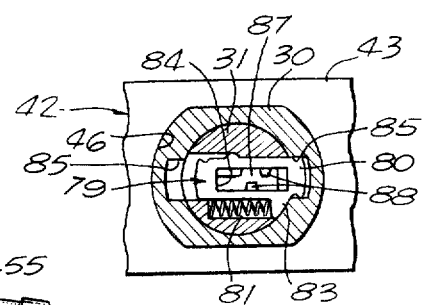
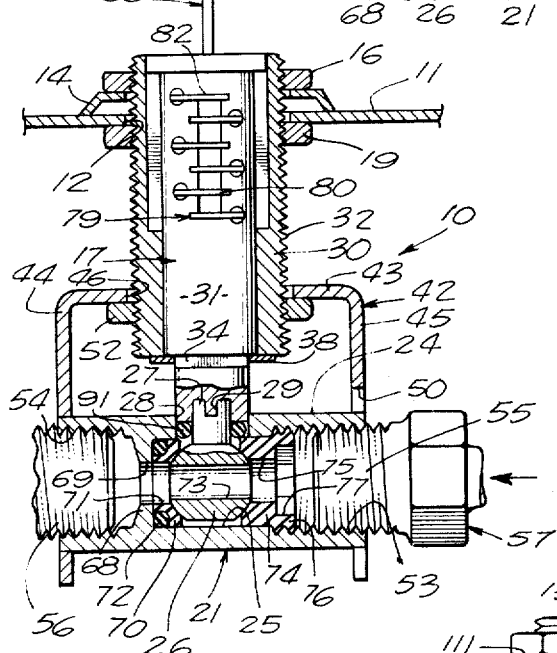
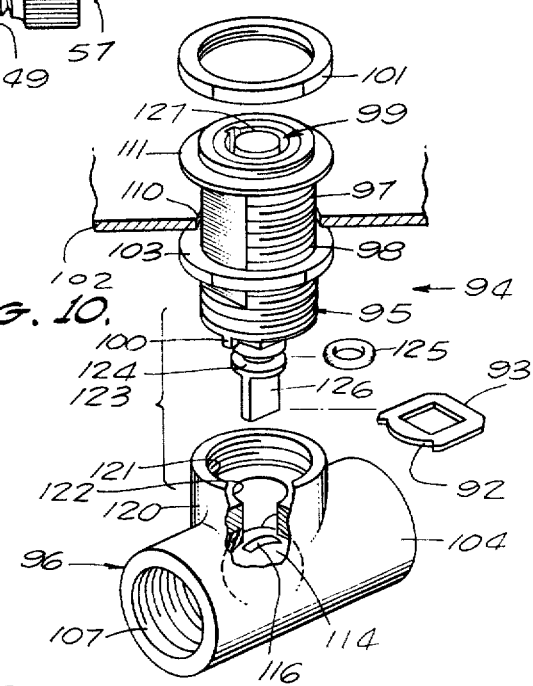
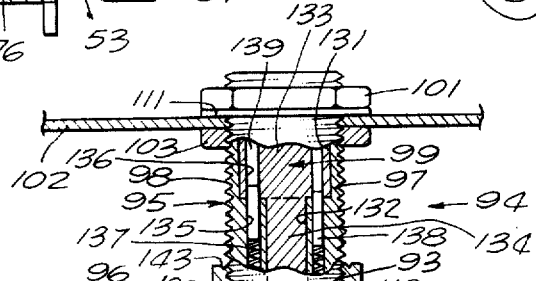
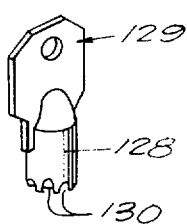

KEY ACTUATED LOCKING VALVE

This invention relates to key actuated locking valves and more particularly to such valves for use in shutting off the flow of gasoline in the fuel line of a motor vehicle to prevent unauthorized use thereof.

According to published statistics the theft of automobiles is continuing at a high rate even though the usual precautions are being taken to remove the key from the ignition and to lock the doors of the automobile when not in use. It thus appears evident that additional safety devices are needed to help prevent the unauthorized use or theft of automobiles. It has been suggested in the past that key controlled locking valves be provided in the fuel line leading from the fuel tank to the engine carburetor. However, the locking valves heretofore proposed for such purposes have not proved satisfactory in that they have been too expensive to manufacture, could not easily be installed in existing automobiles, and did not provide the desired security.

Accordingly, one of the objects of the present invention is to provide a novel and simple key actuated locking valve operable for cutting off the supply of gasoline to the fuel pump of a motor vehicle.

Another object of this invention is to provide a factory assembled, reliably operating, key acutated locking valve that can be readily installed in existing automobiles.

Another object of the invention is to provide a high security key actuated locking valve which is simple and which may be easily assembled, thus producing a cheaply manufactured article.

Still another object of the present invention is to provide novel means for simply and rigidly securing a valve mechanism on a locking mechanism so as to have an operational relationship therewith.

With these and other objects in view, the invention consists in the construction, arrangement and combination of the various parts of the device whereby the objects contemplated are attained, as hereinafter set forth, pointed out in the appended claims and illustrated in the accompanying drawings.

IN THE DRAWINGS

FIG. 6 is a vertical sectional view as taken on line 6—6 in FIG. 5 showing the locking valve in its locked position;

FIG. 7 is a sectional view as taken on line 7—7 in FIG. 6;

FIG. 8 is a fragmentary sectional view as taken on line 8—8 in FIG. 6;

FIG. 9 is a vertical sectional view similar to FIG. 6 but showing the locking valve in its unlockekd position;

FIG. 10 is an exploded view of a modified embodiment of the key actuated locking valve;

FIG. 11 is a vertical sectional view of the embodiment of the key actuated locking valve shown in FIG. 10; and FIG. 12 shows a key employed with the key actuated locking valve shown in FIG. 11.

Figure 1:
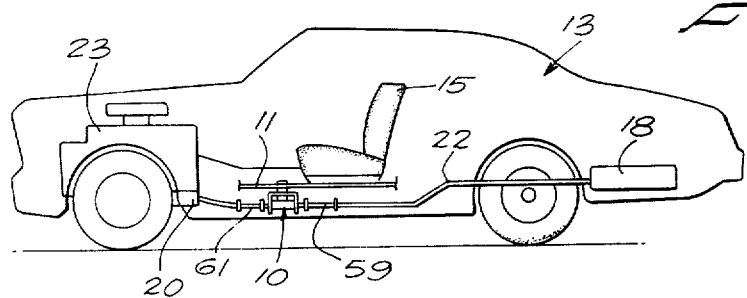
FIG. 1 shows the key actuated locking valve of the present invention installed on an automobile.
Figure 2:
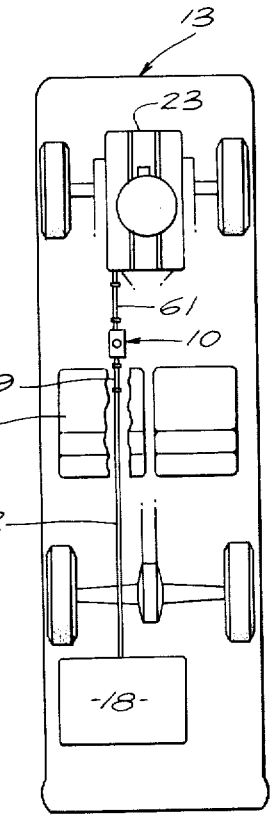
FIG. 2 is a schematic showing of a plan view of the automobile in FIG. 1.

Referring to the drawings, the key actuated locking valve device 10 of the present invention is shown installed in an opening 12 provided in the metal floor pan 11 of the driver's compartment of a motor vehicle 13 in a position adjacent the seat 15 of the driver. The device 10 comprises a vertically disposed locking mechanism 17, the upper end of which extends through the opening 12 in the floor pan 11; and a horizontally disposed valve mechanism 21 operatively engaging the end of the locking mechanism 17 depending below the floor pan 11. The valve mechanism 21 is adapted to be inserted in a cut provided in the fuel line 22 connecting the fuel tank 18 to the fuel pump 20 mounted on the engine 23. The opening 12 can be provided at any position on the floor pan 11 of the driver's compartment that is conveniently accessable to the driver.

Figure 3:
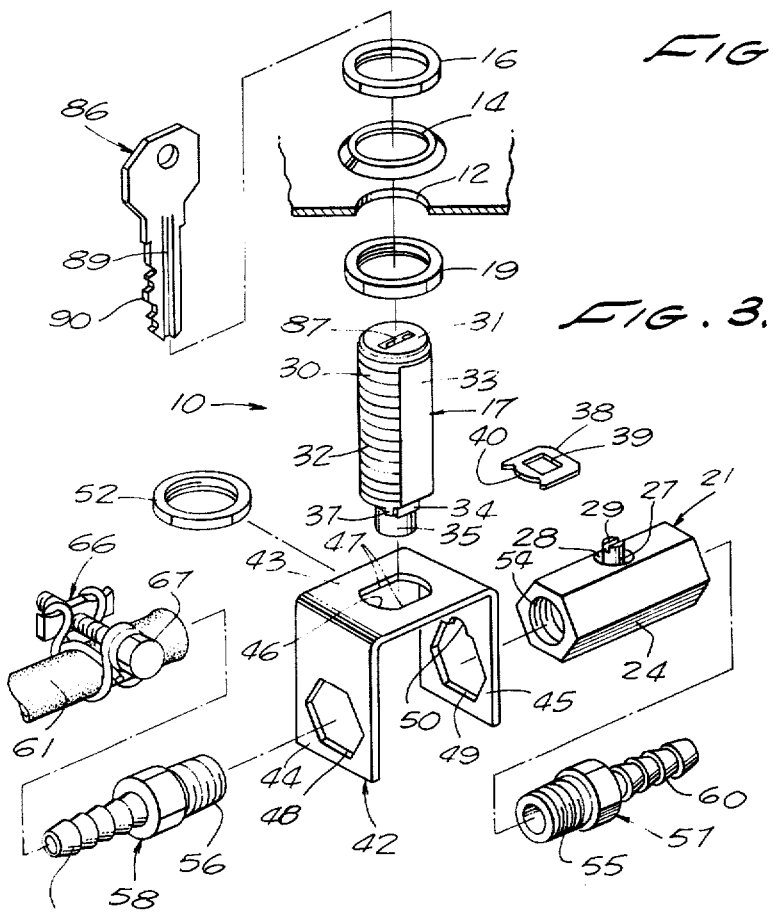
FIG. 3 is an exploded view showing the component parts of the key actuated locking valve of the present invention.
Figure 5:
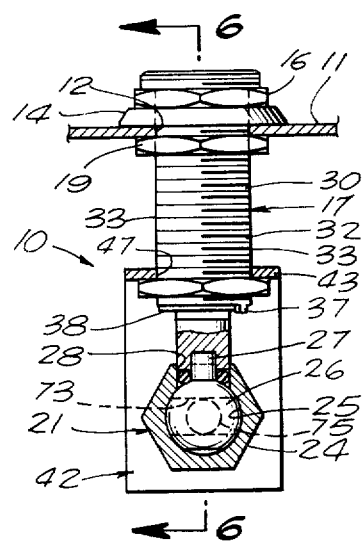
FIG. 5 is a vertical side sectional view as taken on line 5—5 in FIG. 4.

As shown by the exploded view of the compartment parts of the device 10 in FIG. 3, the valve mechanism 21 comprises a valve body 24 having a hexagonal cross section. Mounted in a central bore 25 (FIG. 5) provided in the valve body 24 is a valve ball 26 having a stem 27 on the upper end thereof which projects upwardly through an opening 28 in the upper wall of the valve body 24. The stem 27 has a slot 29 on the end thereof. The lock mechanism 17 comprises a barrel 30 having a cylindrical plug 31 positioned therein. The barrel 30 has threads 32 extending along the length thereof and diametrically disposed flats 33. The plug 31 has a square projection 34 just below the barrel 30 from which a lower, hollow, cylindrical end 35 extends. The hollow end 35 is formed with an internal cross member 36 (FIG. 8). A stop 37 is provided on the bottom of the barrel 30. An end plate 38 is provided with a square opening 39 and an arcuate cutout 40 on the periphery thereof. When the end plate 38 is securely fitted with its square opening 39 on the square projection 34 on the plug 31, the stop 37 on the bottom of the barrel 30 resides within the arcuate cutout 40. As will be subsequently described, the arcuate cutout 40 limits the rotation of the plug 31 by key 86 to a quarter turn within the barrel 30.

A bracket 42 comprising top portion 43 with depending side portions 44 and 45 is provided for holding the valve mechanism 21 in position relative to the locking mechanism 17. The top portion 43 of brackets 42 is provided with an opening 46 which conforms with the cross section of barrel 30 of the locking mechanism by having straight front and back sides 47. The side portions 44 and 45 of bracket 42 are provided with hexagonally shaped openings 48 and 49, respectively, which conform to the cross section of the body 24 of the valve mechanism 21. The opening 49 in the side portion 45 is provided with a clearance 50 to permit the stem 27 on the valve body to pass therethrough during assembly so that the ends of the valve body 24 can be fitted within the openings 48 and 49 in the respective side portions 44 and 45 of the bracket 42. The lower end of the barrel 30 extends through the opening 46 on the top portion 43 of the bracket 42 with the flats 33 thereof engaging the straight sides 47 of the opening 46 and with the lower cylindrical end 35 of the plug 31 inserted in opening 28 with its cross member 36 engaging slot 29 on the end of the stem 27 protruding above the body 24 of the valve mechanism 21. A nut 52 positioned about the stem 27 is then raised and threaded on the lower end of the barrel 30 to hold the locking mechanism 17 in engagement with the valve mechansim 21.

The upper end of the barrel 30 extending through the opening 12 in the floor pan 11 has a collar 14 placed thereon and then a nut 16 which together with a lower nut 19, serves to hold the locking mechanism 17 in position on the floor pan 11. The valve body 24 is provided with a threaded inlet opening 53 on one end thereof and a threaded outlet opening 54 on the other end thereof for receiving the male threaded ends 55 and 56 of the inlet fittings 57 and the outlet fitting 58 respectively.

Figure 4:
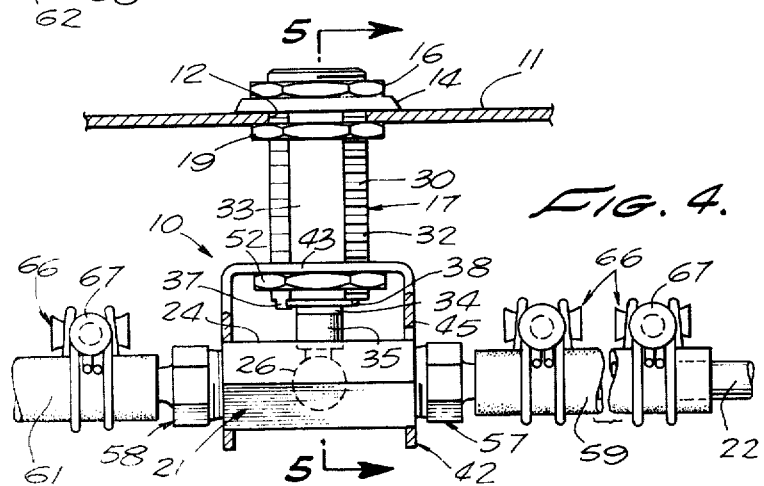
FIG. 4 is a front view of the assemblied key actuated locking valve.

As best shown by the front assembled view of the device 10 in FIG. 4, a length of rubber hose 59 has one end inserted on the barbed end 60 of the inlet fitting 57 and its other end fitted on the end portion of the fuel line 22 leading from the fuel tank 18. Similarly a length of rubber hose 61 has one end thereof positioned on the barbed end 62 of the outlets fitting 58 and its other end fitted on the end of the portion of fuel line 22 leading to the fuel pump 20. A hose clamp 66 provided with a bolt 67 is placed on each of the ends of the lengths of hose 59 and 61 and the bolts 67 are tightened to secure the ends of the hose in position.

The details of the device 10 will be further presented by reference to FIGS. 6–9. Thus, as shown in FIG. 6, the central bore 25 in valve body 24 extends from the threaded inlet opening 53 thereof to an internal shoulder 68 provided with an outlet port 69. The threaded outlet opening 54 is formed on the other side of the shoulder 68. Positioned within the central bore 25 via the inlet opening 53 of the body is an outlet seal 70 having a central opening 71. The outlet seal 70 which is made of nylon or other suitable material has one surface thereof shaped to seat on O-ring 72 against the internal shoulder 68 and its opposite surface rounded to engage the ball 26. The ball 26 provided with a passage 73 therethrough is positioned up against the outlet seal 70 with its stem 27 extending upwardly through the opening 28 in the top of the valve body 24. An inlet seal 74 has a central opening 75 and has threads 76 on the outer surface thereof which engage the threads on the inlet opening 53 of the valve body 24. The inlet seal 74 which may be made of nylon has one surface thereof rounded to engage the ball 26 and the opposite surface formed with a hexagonal opening 77 for receiving the end of a hex wrench (not shown) which can be used to advance the inlet seal 74 in position against the ball 26 in the valve body 24. It can now be seen that the ball 26 is held between the rounded surfaces of the inlet and outlet seals 74 and 70 and can be rotated by its stem 27 to a position wherein the passage 73 in the ball 26 is either aligned with the central openings 71 and 75 in the respective seals 70 and 74 or is at right angles to these openings in which event the valve mechanism 21 is closed.

The details of the locking mechanisms 17 will next be presented. The locking mechanism 17 is of the multiple disc tumbler type. Each disc tumbler 79 slideably fits in a transverse slot 82 in the plug 31. Each disc tumbler 79 has an end 80 which is normally urged to project beyond the surface of the plug 31 by a side spring 81 which engages a shoulder 83 on the disc tumbler 79.

The disc tumbler is also provided with a generally rectangular opening 84. When the plug 31 is assembled within the barrel 30, the ends 80 of the disc tumblers 79 project into a slot 85 provided on the inner surface of the barrel 30.

When a specific key 86 is inserted through the longitudinal key slot 87 which extends down through the plug 31, it is guided by the splines 88 on the inner sides of the slot 87 riding in longitudinal grooves 89 in the key 86. This causes the bitted side 90 of the key 86 to engage the inner sides of the openings 84 in the disc tumblers 79 and forces them inwardly. When all the projecting ends 80 of the disc tumblers recede into the plug 31, the plug is permitted to be rotated by the key 86 a quarter turn in the barrel 30 as limited by the end plate 38 secured on the lower end of plug 31. The key 86 can be removed after the quarter turn of plug 31 in the barrel 30. The downwardly extending cylindrical end 35 of the plug 31 engaging the slot 29 on the end of the stem 27 on the ball 26 thus rotates the ball 26 to its position wherein the valve mechanism 21 is opened, as shown in FIG. 9. An O-ring 91 is positioned in the opening 28 about the stem 27 in which the cylindrical end 35 of plug 31 is seated to prevent leakage of fuel from the valve mechanism 21.

To assemble the device 10, the end of the hexagonal valve body 24 is inserted into the hexagonal opening 49 on the depending side 45 of the bracket 42 and on into the hexagonal opening 48 on the depending side 44 thereof such that the depending sides 44 and 45 are respectively disposed a short distance inwardly from either end of the valve body 24. The clearance 50 on the hexagonal opening 49 on the depending side 45 permits the stem 49 to pass therethrough. The ball 26 in the valve mechanism 21 is then rotated until its passage is aligned with the central openings 75 and 71 in the respective inlet and outlet seals 74 and 70. A rod (not shown) may be inserted through the passage 73 in the ball 26 to hold the valve mechanism 21 in its open position.

The nut 52 is then placed over the stem 27. The locking mechanism 17 with the plug 31 assembled 10 in the barrel 30 is then dropped down through the opening 46 in the top member 43 of the bracket 42 with the flats 33 on the barrel 30 aligned with the straight sides 47 on the opening 46. The lower cylindrical end 35 of the plug 31 is then inserted into opening 28 on the upper wall of the valve body 24 such that its cross member 36 fits in the slot 29 of the stem 27 and its circular end contacts the O-ring 91 provided therein. The nut 52 is then raised and engaged on the end of the barrel 30 and advanced until it contacts the underside of the top member 43 of the bracket 42. The valve mechanism 21 is now securely fastened to the locking mechanism 17.

It should now be especially noted that inasmuch as the barrel 30 of the locking mechanism 17 is long in its axial dimension to accomodate the disc tumblers 79 therein and is provided with flats 33, it is well suited to being rigidly held and fixed to the hexagonally shaped body 24 of the valve mechanism 21 by the bracket 42. Thus the opening 46 in the top portion 43 and the openings 48 and 49 in the respective sides 44 and 45 of the bracket 42 provide a simple and positive manner of connecting the locking mechanism 17 in operative position on the valve mechanism 21 to provide the device 10.

It should now be evident that the key actuated locking valve device 10 of the present invention is constructed so that it can be simply assembled together at the factory to form a single unit such that the buyer does not have to assemble these parts together.

It should be further noted that when the opening 19 has been drilled in the floor pan 11 adjacent the driver's seat, the upper end of the barrel 30 of the locking mechanism 17 need be merely inserted up through the opening 19 and the collar 14 and the nut 16 engaged on the protruding end thereof to secure the device 10 in position. The fuel line 22 on the underside of the chassis of the automobile 13 can then be cut in the vicinity of the device 10 and the lengths of rubber hoses 59 and 61 can then be inserted on the barbed ends 60 and 62 of the respective fittings 57 and 58 and the cut ends of the fuel line 22, as previously described.

Reference will next be made to FIGS. 10–12 which illustrate another embodiment of the key actuated locking valve device of the present invention bearing the designation 94. The device 94 includes a locking mechanism 95 and a valve mechanism 96. The locking mechanism 95 comprises a barrel 97 having threads 98 extending along the length of the body thereof and a cylindrical plug 99 which extends through the barrel 97. The bottom of barrel 97 is provided with a stop 100 which resides in an arcuate cutout 92 provided in an end plate 93 secured on the end portion of plug 99. The arcuate cutout 92 limits the rotation of the plug 99 in the barrel 97 to a quarter turn.

The valve mechanism 96 has a cast valve body 104 which is provided with a central bore 105 having a threaded inlet opeing 106 and a threaded outlet opening 107. An internal shoulder 108 is provided adjacent the threaded outlet opening 107. The shoulder 108 is provided with a port 109. A nylon outlet seal 112 provided with a central opening 113 is positioned in the bore 105 adjacent the shoulder 108. A ball 114 provided with a transverse passage 115 and a slot 116 on the upper end thereof is seated against the rounded inner surface of the outlet seal 112. A nylon inlet seal 117 is provided having a central hexagonal opening 118 and threads 119 on the outer surface thereof. By inserting a hex wrench in the opening 118, the inlet seal 117 is advanced into the threaded inlet opening 106 of the body 104 so that its rounded inner surface engages the ball 114. The upper surface of the cylindrical valve body 104 is formed with a boss 120 provided with a threaded enlarged bore 121 to receive the threaded end of the barrel 97 and with a smaller bore 122 to slideably receive the circular end portion 123 of the cylindrical plug 99 which extends below the barrel 97. The circular end portion 123 is formed with a groove 124 to receive an O-ring 125 which serves to seal the bore 122 in the boss of the valve body 104. As the threaded end of barrel 99 is advanced into the threaded bore 121 in the boss 120 of the valve body, a tang 126 depending from the cylindrical end portion 123 is advanced into the slot 116 provided on the upper end of the ball 114.

The locking mechanism 95 for the embodiment of the key actuated locking valve device 94 shown in FIGS. 10 and 11 is of the cylindrical pin tumbler type with a circular keyway 127. As shown in FIG. 12, the lower end of the cylindrical body 128 of the key 129 is provided with end notches 130.

The barrel 97 is formed with a large diameter upper internal cylindrical opening 131 and a smaller diameter lower internal cylindrical opening 132. The cylindrical plug 99 is formed with a large diameter upper cylindrical body portion 133 provided with the circular key way 127 and a smaller diameter lower cylindrical body portion 134. The lower portion of the barrel 97 is provided with a plurality of blind holes 135 disposed in a circular arrangement about the lower internal cylindrical opening 132 thereof. The bottom of the large diameter upper cylindrical body portion 133 of the plug 99 is provided with similarly arranged holes 136 therethrough. A spring 137 is located in the bottom of each blind hole 135 and a pin 138 is positioned in each hole 135 above the spring 137. The pins 138 are of different length and extend above the bottom of the large cylindrical body portion 133 through the holes 136 therein. An additional pin 139 is positioned in each hole 136. It should now be clear that the pins 138 prevent the plug 99 from rotating on the barrel 97. However, when a specific key 129, such as shown in FIG. 12, is inserted in the circular keyway 127, the end notches 130 on the bottom of the key 129 contact the inner side edges of the pins 139 and thereby depress the pins 139 and consequently the pins 138. When so depressed, the upper surface of the latter pins 138 are all aligned with the lower surface of the large cylindrical body portion 133 of the plug 99, thus permitting the plug 99 to be rotated to thereby rotate the ball 114 and close the valve mechanism 96.

It should now be evident that the embodiment of the key actuated locking valve device 94 as shown in FIGS. 10–12 provides for the lower portion of the barrel 97 of the locking mechanism 95 to be secured to the threaded boss 120 on the upper surface of the valve body 104 of the valve mechanism 96. The threads on the barrel 97 may be staked at point 143 to securely hold these components together.

To install the unit thus provided in an automobile, when the barrel 97 is inserted up through an opening 110 drilled in the floor pan 102, a collar 111 and then a nut 101 is placed on the end of the barrel. Nut 101 together with a nut 103 on the barrel 95 below the floor pan 102 holds the barrel 97 securely in position. The fuel line below the automobile is then cut. An inlet fitting 140 and an outlet fitting 141 on the threaded inlet opening 106 and outlet opening 107 of the valve body 104 are then coupled by hoses (not shown) to the cut ends of the fuel line connecting the fuel tank to the fuel pump in a manner similar to that described and shown in connection with FIG. 4.

It should now be clear that by installing the key actuated locking valve device of the present invention on an automobile, when the driver parks the automobile he can, in addition to the usual recommended precautions, close the locking valve device by the use of the tumbler key and then withdraw the key. Thus, although a thief may be able to open the door of the automobile and use a jumper to start the engine, he will not be able to travel more than a half block or so because of the closed valve in the fuel line. The locking valve device of the present invention thus provides an inexpensive, easily installed, high-security, anti-theft device which is highly useful in helping to prevent the unauthorized use of existing automobiles.

While the invention shown and described herein has been well adapted to fulfill the objects and advantages previously mentioned as desirable, it is to be understood that the invention is not limited to the specific features shown and described but that the means and configuration herein disclosed are susceptible of modification in form, proportion and arrangement of parts without departing from the principle involved or sacrificing any of its advantages and the invention is therefore claimed in embodiments of various forms all coming within the scope of the claims which follows.

What is claimed is:

1. A key actuated locking valve device comprising a valve body having hexagonally shaped cross sectional end portions and an inlet and outlet opening, a valve ball having a passage therethrough and seated in said valve body for rotation between an open position in which said inlet and outlet opening is connected and a closed position, said valve ball having a coupling element on the upper end thereof extending through an access opening on said valve body, a tumbler lock including a barrel having flats thereon and threads along the length thereof, a cylindrical plug in said barrel having its lower end extending into the access opening on said valve body and adapted to engage the coupling element on said valve ball, a bracket having a top member and spaced depending side members, said top member having an opening therein with straight sides for engaging the flats on said barrel and said depending side members each having an hexagonal opening therein for engaging a respective end portion of said valve body, a nut on said barrel for retaining said bracket on said barrel and thereby holding the lower end of said plug engaged to the coupling element on said valve ball, and a key for rotating said plug relative to said barrel and thereby rotating said valve ball between said open and closed position in said valve body, said key being removable from said tumbler lock when the valve ball is in its closed position.

2. The invention in accordance with claim 1 including:
   an inlet fitting having a threaded end and a barbed end,
   an outlet fitting having a threaded end and a barbed end,
   wherein said inlet fitting has its threaded end coupled to the inlet opening of said valve body and said outlet fitting has its threaded end coupled to the outlet opening of said valve body,
   a first length of hose having one end thereof connected to the barbed end of said inlet fitting, and
   a second length of hose having one end thereof connected to a barbed end of said outlet fitting, and
   a hose clamp for holding the end of said length of hose on said barbed end of said fitting.

3. The invention in accordance with claim 1 wherein the upper end of said barrel extends through an opening provided in the floor pan of the driver's compartment of a motor vehicle, and, including
   an upper and lower nut on said barrel for engaging the upper end of said barrel on said floor pan.

4. A key actuated locking valve device comprising: a valve body having an inlet and outlet opening and having flats on the end portions thereof, a valve ball having a passage therethrough and seated in said valve body for rotation between an open position in which said inlet and outlet opening is connected and a closed position, said valve ball having a stem with a slot extending through an access opening in said valve body, a tumbler lock including a barrel having flats and threads along the length thereof, a rotatable plug in said barrel having a cylindrical hollow end with an internal cross member adapted to extend into the access opening in said valve body with its cross member engaging the slot on the stem of the valve ball, a bracket having a top member and depending side members, said top member having an opening with straight sides for engaging the flats on said barrel and said depending side members each having an opening therein with straight sides for engaging the flats on the end portions of said valve body, a nut on said barrel for retaining said bracket on said barrel and thereby holding the cylindrical hollow end of said plug coupled to the stem on the upper end of said valve ball, and a key for rotating said plug relative to said barrel and thereby rotating said valvle ball between said open and closed position in said valve body, said key being removable from said tumbler lock when the valve ball is in its closed position.

* * * * *